United States Patent
Li et al.

(10) Patent No.: US 8,442,567 B2
(45) Date of Patent: May 14, 2013

(54) SYSTEM AND METHOD FOR COOPERATIVE SPECTRUM SENSING IN COGNITIVE RADIO SYSTEMS

(75) Inventors: Dongdong Li, Frisco, TX (US); Dandan Wang, Berkeley Heights, NJ (US); Mazin Al-Shalash, Frisco, TX (US); Anthony C. K. Soong, Plano, TX (US); Guodong Zhao, Beijing (CN); Chenyang Yang, Beijing (CN)

(73) Assignee: FutureWei Technologies, Inc., Plano, TX (US)

( * ) Notice: Subject to any disclaimer, the term of this patent is extended or adjusted under 35 U.S.C. 154(b) by 511 days.

(21) Appl. No.: 12/727,906

(22) Filed: Mar. 19, 2010

(65) Prior Publication Data
US 2010/0248760 A1 Sep. 30, 2010

Related U.S. Application Data

(60) Provisional application No. 61/163,399, filed on Mar. 25, 2009.

(51) Int. Cl.
*H04W 72/00* (2009.01)
*H04B 17/00* (2006.01)
*H04B 7/00* (2006.01)

(52) U.S. Cl.
USPC ......... 455/509; 455/62; 455/63.1; 455/67.11; 455/454

(58) Field of Classification Search ................ None
See application file for complete search history.

(56) References Cited

U.S. PATENT DOCUMENTS
2008/0261639 A1 10/2008 Sun et al.
2009/0197550 A1* 8/2009 Huttunen et al. .......... 455/161.1

OTHER PUBLICATIONS

Chen, Y., "Optimum Number of Secondary Users in Collaborative Spectrum Sensing Considering Resources Usage Efficiency," IEEE Communications Letters, vol. 12, No. 12, Dec. 2008, pp. 877-879.
Digham, F.F., et al., "On the Energy Detection of Unknown Signals over Fading Channels," IEEE, 2003, pp. 3575-3579.
Haykin, S., "Cognitive Radio: Brain-Empowered Wireless Communications," IEEE Journal on Selected Areas in Communications, vol. 23, No. 2, Feb. 2005, pp. 201-220.
Ma, J., et al., "Signal Processing in Cognitive Radio," IEEE, vol. 97, No. 5, May 2009, pp. 805-823.
Ma, J., et al., "Soft Combination and Detection for Cooperative Spectrum Sensing in Cognitive Radio Networks," IEEE Transactions on Wireless Communications, vol. 7, No. 11, Nov. 2008, pp. 4502-4507.
Mishra, S.M., et al., "Cooperative Sensing among Cognitive Radios," IEEE, 2006, 6 pages.
Selen, Y., et al., "Sensor Selection for Cooperative Spectrum Sensing," IEEE, 2008, 11 pages.

(Continued)

*Primary Examiner* — Philip Sobutka
(74) *Attorney, Agent, or Firm* — Slater & Matsil, L.L.P.

(57) ABSTRACT

A system and method for cooperative spectrum sensing in cognitive radio (CR) systems is provided. A method for CR user operation includes coordinating with partner CR users to share spectrum sensing information, combining spectrum sensing information from partner CR users, and determining if a transmission opportunity exists based on the combined spectrum sensing information. The method also includes transmitting a message to a CR user if the transmission opportunity exists, and storing the message if the transmission opportunity does not exist.

22 Claims, 6 Drawing Sheets

OTHER PUBLICATIONS

Zhao, G., et al., "Proactive Detection of Spectrum Holes in Cognitive Radio," IEEE, 2009, 5 pages.

Zhou, X., et al., "Probability-based Combination for Cooperative Spectrum Sensing in Cognitive Radio Networks," IEEE, 2009, 5 pages.

International Search Report and Written Opinion, International Application No. PCT/CN2010/071288, Applicant: Huawei Technologies Co., Ltd., et al., Aug. 19, 2010, 12 pages.

Cabric, D., et al., "Implementation Issues in Spectrum Sensing for Cognitive Radios," in Proc.Asilomar Conference on Signals,Systems,and Computer, 2004, pp. 772-776.

Zhou, et al., "A Cooperative Sensing Technique Based on Energy Detection and Subscriber Cooperation," Journal of Hunan City University (Nature Science),vol. 16, No. 2, Jun. 2007, 4 pages. (English Abstract).

* cited by examiner

SYSTEM AND METHOD FOR COOPERATIVE SPECTRUM SENSING IN COGNITIVE RADIO SYSTEMS

This application claims the benefit of U.S. Provisional Application No. 61/163,399, filed on Mar. 25, 2009, entitled "Method and Apparatus for Cooperative Spectrum Sensing in Cognitive Radio Systems," which application is hereby incorporated herein by reference.

TECHNICAL FIELD

The present invention relates generally to wireless communications, and more particularly to a system and method for cooperative spectrum sensing in cognitive radio systems.

BACKGROUND

Cognitive Radio (CR) is considered as a type of radio in which communications systems are aware of their environment as well as their internal state and may make decisions about their radio operating behavior based on that information and predefined objectives. CR users can utilize licensed spectrum bands when they do not cause interference to existing users (also referred to as licensed users (LUs) or primary users (PUs)). A time when CR users can transmit without causing interference to the primary users is called a spectrum opportunity. Clearly, the ability to sense the spectrum to detect spectrum opportunities is crucial to CR performance and has been the subject of considerable research.

The basic concept of CR is to allow unlicensed CR users, also called secondary users, to use licensed spectrum bands (also referred to as licensed frequency bands) as long as they do not cause interference to licensed users. Therefore, CR users must be able to identify and use spectrum bands that are not being used by primary users. In practice, the available spectrum bands for CR users may vary with time and location.

SUMMARY

These and other problems are generally solved or circumvented, and technical advantages are generally achieved, by embodiments of a system and method for cooperative spectrum sensing in cognitive radio systems.

In accordance with an embodiment, a method for cognitive radio (CR) user operation is provided. The method includes coordinating with partner CR users to share spectrum sensing information, combining spectrum sensing information from the partner CR users, determining if a transmission opportunity exists based on the combined spectrum sensing information, transmitting a message to a CR user if the transmission opportunity exists, and storing the message if the transmission opportunity does not exist.

In accordance with another embodiment, a method for cognitive radio (CR) user operation is provided. The method includes sensing a spectrum, and coordinating with partner CR users to share spectrum sensing information. The spectrum includes a frequency band used for transmissions by a CR user that overlaps with at least a portion of a protected frequency band. The coordinating includes sharing information based on a relative position of the CR user and the partner CR users.

In accordance with another embodiment, a communications device is provided. The communications device includes: a receiver coupled to an antenna, a transmitter coupled to the antenna, and a processor coupled to the receiver and to the transmitter. The receiver receives signals detected by the antenna, and the transmitter transmits signals using the antenna. The processor senses a state of a spectrum band over which signals are transmitted and received, to combine spectrum band state information received from neighboring communications devices, and computes a decision threshold for deciding if the spectrum band is occupied or idle.

An advantage of an embodiment is that spectrum sensing information from partner CR users may be combined in a weighted manner based on their relative distance from a fusion CR user. The weighted combining may help to place an emphasis on spectrum sensing information that may be more relevant to the fusion CR user due to a relative proximity of the source of the spectrum sensing information (i.e., a partner CR user) to the fusion CR user.

A further advantage of an embodiment is that spectrum sensing decisions made at a partner CR user may be made based on a threshold that is a function of a probability of false alarm, which, in turn, may be a function of a distance between the partner CR user and the fusion CR user.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 3b diagram of a detailed view of a processor and a memory shown in FIG. 3a;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a cognitive radio (CR) system operating in close proximity to a licensed system. The invention may also be applied, however, to other systems wherein a CR system uses directional antennas and/or antenna arrays with beamforming.

Figure 1:
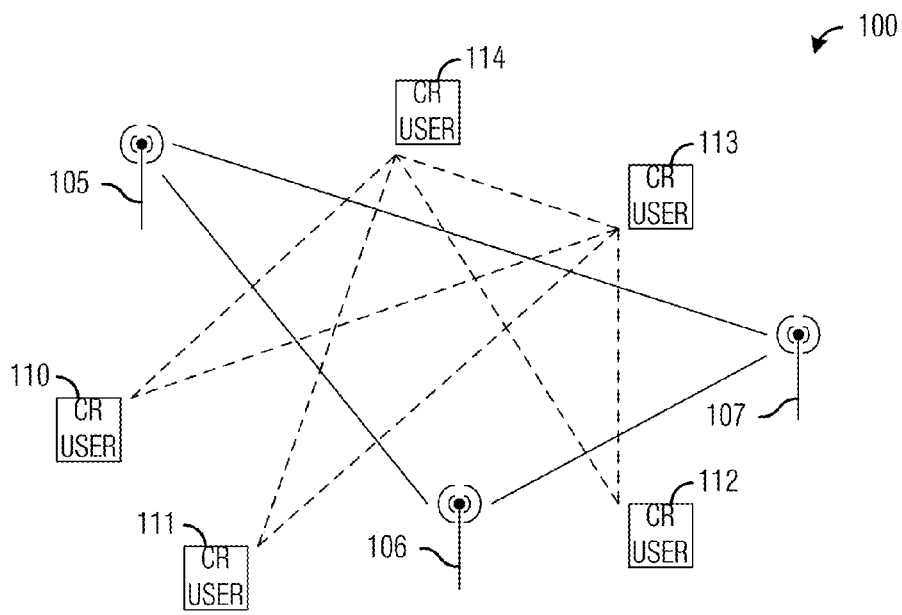
FIG. 1 is a diagram of an operating environment.

FIG. 1 illustrates an operating environment 100, wherein operating environment 100 includes a licensed communications system and a CR communications system. The licensed system and the CR system operate in close proximity and share a spectrum band. The licensed system includes licensed users 105-107 and the CR system includes CR users 110-114. Transmissions between licensed users are shown as solid lines, while transmissions between CR users are shown as dashed lines. A pair of CR users, such as CR user 110 and CR user 114, opportunistically operates on the spectrum band that is assigned to the licensed system. The CR users may use spectrum sensing to determine the presence or absence of licensed activity within the spectrum band and if there is no licensed activity, the CR users may transmit in the spectrum band.

In the CR communications system, a communication may be established when a CR transmitter sends its signal without interfering with licensed users, and additionally, a CR receiver can decode such a signal under certain interference from licensed users. In other words, a communication opportunity appears when CR users can transmit legally (causing no interference to licensed users) and receive reliably.

In practical systems, detection performance of local spectrum sensing by an individual CR user may be degraded significantly in deep fading and shadowing channels. Therefore, cooperative spectrum sensing has been proposed to improve detection capabilities by taking advantage of spatial diversity in multiple user networks. In cooperative spectrum sensing, a CR user intending to launch a communication (also referred to as a fusion CR user) finds some nearby CR users (also referred to as partner CR users) to perform collaborative spectrum sensing.

A partner CR user may be a CR user that shares spectrum sensing information with a fusion CR user, which may make use of the spectrum sensing information to improve its primary user (PU) detection performance. A CR user may or may not be a partner CR user. For example, referring to FIG. 1, CR user 111 and CR user 114 may be neighbor CR users to CR user 110. However, it may be possible that only CR user 114 functions as a partner CR user to CR user 110 (operating as a fusion CR user).

However, many current forms of cooperative spectrum sensing focus on how to combine sensing information of partner users, how to select the partner users, how many partner users are enough, and so forth. Furthermore, there is an implicit assumption that the transmission range of PUs is much larger than that of CR users. This has the implication that the signal from a PU at each of the CR users comes from the same PU and the PU is the target PU the CR users intend to detect. This assumption is true in certain situations, for example, in IEEE 802.22, where each CR user receives the primary signal from a common TV station.

However, when the transmission range of a PU's transmission is comparable with or smaller than the transmission range of CR users, then diversity may not be obtained because different CR users may receive sensing signals from different PU's. For example, in IEEE 802.22, with wireless microphones operating in a television band, the PUs (the wireless microphones) typically have smaller transmission range than the CR users but still need to be protected in IEEE 802.22. In existing methods, there is a risk that improper partner CR users may be used.

In general, the improper partner CR users are CR users that are far away from the fusion CR user. The improper partner CR users may report non-target PU information, which may confuse the fusion CR user, degrade the detection performance, and lead to overlooked spectrum opportunities. Therefore, it is critical to select proper partner CR users for cooperative spectrum sensing.

In cooperative spectrum sensing, each CR user performs spectrum sensing independently and then forwards its sensing information to a common receiver (a fusion user), for decision under a fusion rule. An energy detector may be utilized at each CR user since it has low complexity and does not need any prior information about primary signals. Furthermore, the feedback link from partner CR users to the fusion user is assumed to be ideal, which means there is no error during the transmission of the sensing information. Or if such transmission errors occur, they can be detected and/or corrected using well known communication and coding techniques.

Denote $h_{pi}$ as the channel gain between a PU and i-th CR user and s(t) as a primary signal, then the received signal at i-th CR user can be expressed as $$x_i(t)=h_{pi}s(t)+n_i(t), i=1, 2, \ldots, K, \quad (1)$$

where $n_i(t)$ is the additive white Gaussian noise (AWGN). Accordingly, the distribution of its local decision variable can be expressed as $$X_i \sim \chi_{2M}^2(2\gamma_i), \quad (2)$$

where $\gamma_i$ is the instantaneous signal-to-noise ratio (SNR) of the received signal, M is the number of independent samples, and $\chi_{2M}^2(2\gamma_i)$ denotes a non-central chi-square distribution with 2M degrees of freedom and a non-centrality parameter $2\gamma_i$. According to the central limit theory (CLT), $X_i$ can be approximated by Gaussian distribution as $$Y_i \sim N[2(M+\gamma_i), 4(M+2\gamma_i)] \quad (3)$$

when M is large. Then the sensing information $Y_i$ will be sent to a fusion user for a final decision.

Assume that PUs are randomly located on a plane and form a Poisson point process. For a certain region with unit area S, the number of active PUs within S follow a Poisson distribution with parameter $\lambda S$, i.e., $$Pr\{k \text{ active } PUs \text{ in } S\} = \frac{e^{-\lambda S}(\lambda S)^k}{k!}, \quad (4)$$

where $Pr\{\Phi\}$ represents the probability of $\Phi$, ! denotes a factorial operation, and $\lambda$ is the expected number of PUs per unit area S. Then the probability of no active PUs within S can be expressed as $$Pr\{k=0, S\}=e^{-\lambda S}, \quad (5)$$

which is also the probability of spectrum opportunity for CR. Obviously, it exponentially decreases as S increases. In practice, instead of PUs within the nearby region of a fusion user, some non-target PU's in other regions may also be detected by partner users, which enlarges S and leads to missed spectrum opportunities.

Figure 2:
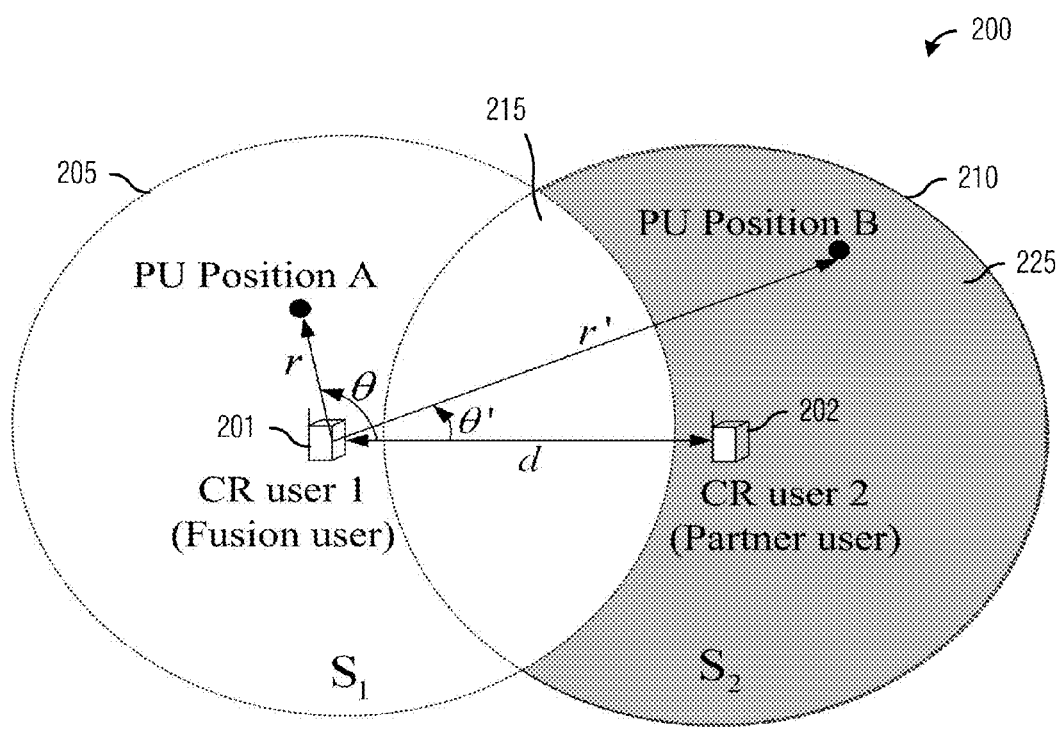
FIG. 2 is a diagram of a communication-oriented cooperative spectrum sensing communications system.

FIG. 2 illustrates a communication-oriented cooperative spectrum sensing communications system 200. Consider CR user 1 (labeled CR user 201), acting as a fusion CR user, intends to launch a communication using the same spectrum band as PUs and needs to perform cooperative spectrum sensing. Assume CR user 2 (labeled CR user 202) as its nearby partner CR user, whose distance to the fusion CR user (CR user 201) is d. Although the following discussion studies two-user cooperative spectrum sensing for single PU detection, extension to multiple PUs is straightforward. In FIG. 2, two circles with CR users 201 and 202 in the centers (shown as circle 205 and circle 210, respectively) are called sensing boundaries, wherein a corresponding CR user can reliably detect a PU located within its sensing boundary. Denote regions $S_1$ and $S_2$ as the regions inside circles 205 and 210, respectively.

A goal of the utilization of the partner CR user (e.g., CR user 202) is to improve the sensing performance in region $S_1$ (circle 205). Existing methods on cooperative spectrum sensing may improve the detection performance when a PU is in the region $S_1 \cap S_2$, which represents an area common to both circles 205 and 210 (shown as area 215), but they may also detect a non-target PU in a shaded region 225 defined as $\overline{S}_1 \cap S_2$, where $\overline{S}_1$ represents an area outside of $S_1$, and containing, for example, PU position B. Shaded region 225 may be a region that the fusion user (e.g., CR user 201) may not care about at all. In other words, existing cooperative spectrum sensing cannot distinguish a PU location either in $S_1$ or in $\overline{S}_1 \cap S_2$, such as PU Positions A or B in FIG. 2, which enlarges the sensing region from $S_1$ to $S_1 \cup S_2$ and overlooks spectrum opportunities. As used herein, $\cup$ denotes a union operation and $\cap$ denotes an intersection operation.

In CR, a communication may be established when a CR transmitter sends its signal without interfering with PUs, and simultaneously, a CR receiver can decode the signal under a certain interference from PUs. In other words, a spectrum opportunity appears when CR users are allowed to transmit and can receive signals reliably. However, as described previously, the detection of a non-target PU may confuse the fusion user and lead to some missed spectrum opportunities. A cooperative spectrum sensing from the perspective of a CR communication that utilizes partner users to find more spectrum opportunities for the fusion user is provided below. The cooperative spectrum sensing with the perspective of a CR communication is referred to as communication-oriented cooperative spectrum sensing.

Figure 3A:
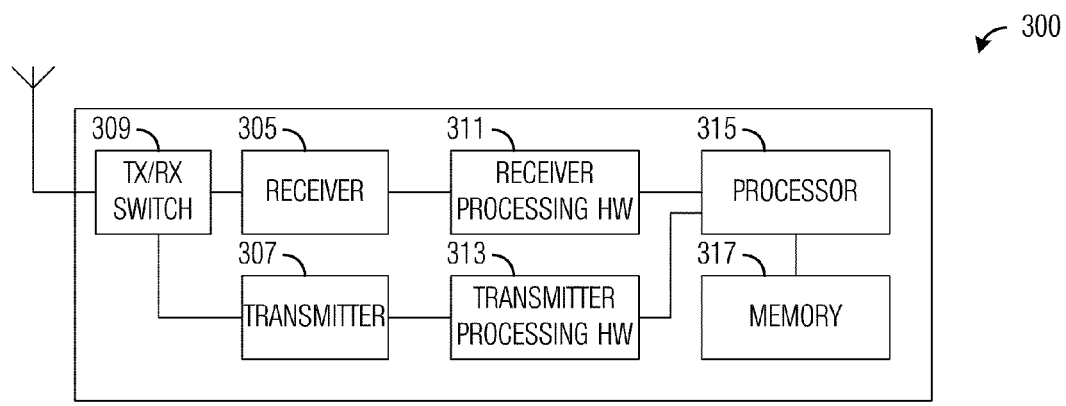
FIG. 3a is a diagram of a CR user.

FIG. 3a illustrates a CR user 300. CR user 300 includes a receiver 305 and a transmitter 307 for use in receiving signals and transmitting signals. Depending on configuration, a transmit/receive (TX/RX) switch 309 may allow for the receiver 305 and the transmitter 307 to share an antenna or antennas. Alternatively, the receiver 305 and the transmitter 307 may have dedicated receive and transmit antennas.

CR user 300 also includes receiver processing hardware 311 that may be used for processing received signals, including filtering, decoding, error detecting and correcting, amplifying, digitizing, mixing, and so forth. CR user 300 also includes transmitter processing hardware 313 that may be used for processing signals to be transmitted, including filtering, encoding, mixing, amplifying, and so on. Output of receiver processing hardware 311, such as data, may be provided to a processor 315. Processor 315 may be used to perform computations using the output of receiver processing hardware 311. A memory 317 may be used to store data, applications, programs, configuration information, and so forth.

Figure 3B:
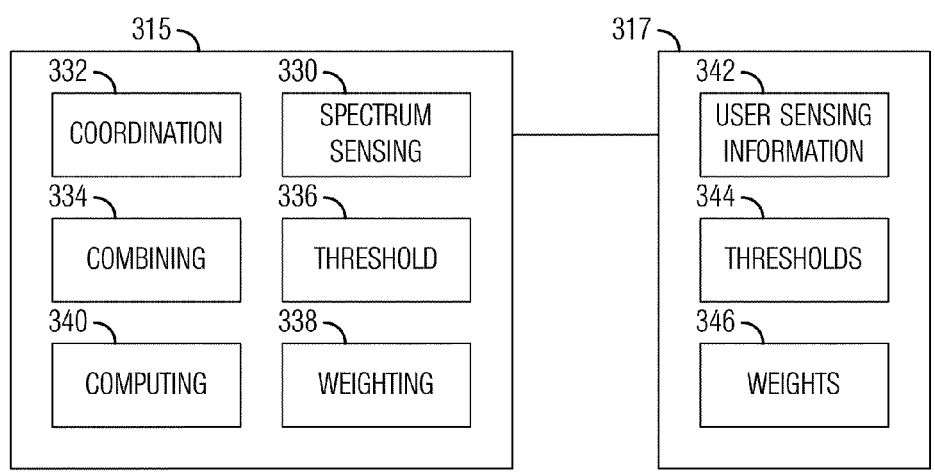

FIG. 3b illustrates a detailed view of processor 315 and memory 317. Processor 315 includes a spectrum sensing unit 330. Spectrum sensing unit 330 may be used to sense a received energy within a specified spectrum band. Then, from the received energy, it may be determined if a transmission is taking place. Spectrum sensing unit 330 may sense the received energy by filtering a received signal to help eliminate or reduce signals outside of the specified spectrum band, measure a received energy within the specified spectrum band, accumulate the received energy for a specified amount of time, and then based on the accumulated received energy, decide if a transmission is taking place in the specified spectrum band.

Processor 315 also includes a coordination unit 332, combining unit 334, threshold unit 336, and weighting unit 338. Coordination unit 332 may be used to coordinate communications with other CR users operating in a general vicinity of CR user 300. Coordination unit 332 may assist the CR users to share spectrum sensing information. Combining unit 334 may be used to combine spectrum sensing information from the CR users into information that may be used to determine if a spectrum opportunity is available. Combining unit 334 may use a soft decision technique or a hard decision technique or a combination of both to combine the spectrum sensing information from the CR users. A detailed description of the soft decision technique and the hard decision technique is provided below.

Threshold unit 336 may be used to assist CR user 300 in making a hard decision regarding spectrum sensing information generated by CR user 300 itself. After performing spectrum sensing, CR user 300 may perform a hard decision to determine if it has detected the presence of a PU. Threshold unit 336 may generate a threshold based on a probability of a false alarm that may be used to make the hard decision. A detailed description of the operation of threshold unit 336 is provided below.

Weighting unit 338 may be used to assist CR user 300 to assign a weight to spectrum sensing information provided by other CR users. As an example, weighting unit 338 may assign a greater weight (significance) to spectrum sensing information from a CR user that is closer to CR user 300, and a lesser weight to spectrum sensing information from a CR user that is further away from CR user 300. In addition to distance from CR user 300, weighting unit 338 may make use of other information in assigning weights, such as a history of accuracy of spectrum sensing information, and so forth. The history of accuracy may be recorded by CR user 300 or from other CR users and provided to CR user 300. A detailed description of the operation of weighting unit 338 is provided below.

Processor 315 further includes a computing unit 340 that may be used to determine from the combined spectrum sensing information from the CR users if a transmission opportunity exists for CR user 300.

Memory 317 may be used to store information such as user sensing information (user sensing information store 342), both as detected by CR user 300 and received from other CR users through coordination, threshold(s) generated by threshold unit 336 (thresholds store 344), and weights generated by weighting unit 338 (weights store 346).

Figures 4, 5:
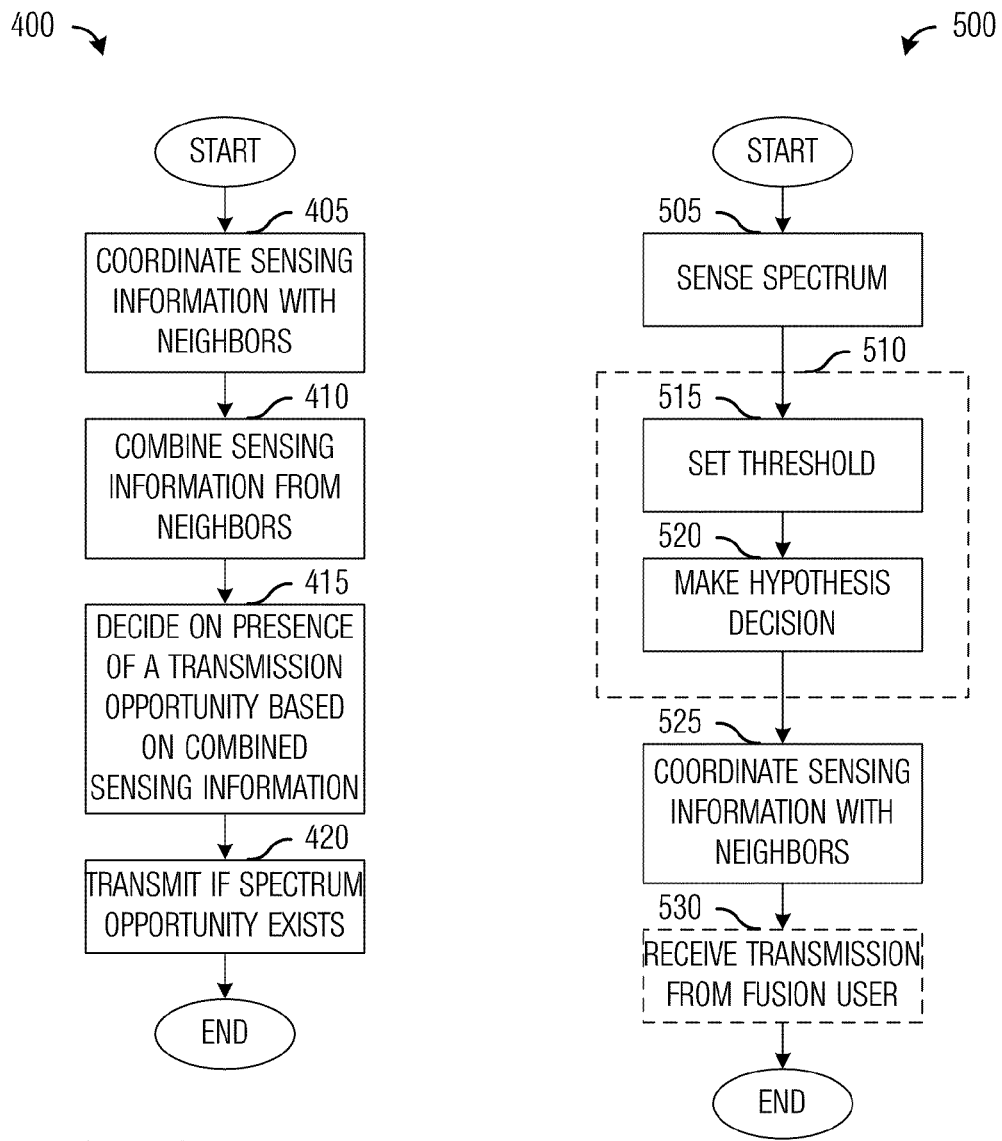
FIG. 4 is a flow diagram of CR user operations in transmitting information.
FIG. 5 is a flow diagram of partner CR user operations in providing spectrum sensing information to a fusion CR user.

FIG. 4 illustrates a flow diagram of fusion CR user operations 400 in transmitting information. Fusion CR user operations 400 may be indicative of operations occurring in a fusion CR user, such as CR user 300, as the fusion CR user prepares to transmit to another CR user. Fusion CR user operations 400 may occur while the fusion CR user is in a normal operating mode and has information to transmit to the other CR user.

Fusion CR user operations 400 may begin with the fusion CR user coordinating spectrum sensing information with other CR users (partner CR users) in its vicinity (block 405).

The fusion CR user and its partner CR users may share results of their spectrum sensing operations.

In order to take communication opportunities with physical regions as shown in FIG. 2 into account, hypotheses $H_1$ and $H_0$ are defined as whether or not there is a spectrum opportunity for the fusion CR user, respectively. Then $H_0$ and $H_1$ represent that a PU is active in Region $S_1$ ($H_0$) and is not ($H_1$), respectively. Therefore, in $H_1$ case, a spectrum opportunity for the fusion CR user is identified when decision is $H_1$, while in $H_0$ case, an active PU is detected when decision is $H_0$ and is missed when decision is $H_1$, which may lead to inference to the active PU. They are summarized in the following table:

|  | Decision is $H_0$ | Decision is $H_1$ |
|---|---|---|
| $H_0$ is true | PU detected | PU missed |
| $H_1$ is true | Opportunity missed | Opportunity detected |

Furthermore, $H_1$ consists of three sub-cases:
1) An active PU in the shaded area,
2) An active PU outside both Regions $S_1$ and $S_2$,
3) No active PU at all.

Since signal strength from a PU in Case 1) is much higher than those in Cases 2) and 3), the first case is dominant in detection. Thus only Case 1) in $H_1$ is considered and the impact of Cases 2) and 3) will be ignored in algorithm development and will be investigated by simulation. Then the hypotheses can be expressed as $$\begin{cases} H_0: & \text{An active } PU \in S_1, \\ H_1: & \text{An active } PU \in \overline{S}_1 \cap S_2. \end{cases} \quad (6)$$

Under this definition, there is a detection event or a false detection event if an active PU within $S_1$ or $\overline{S}_1 \cap S_2$ is identified, respectively. Therefore, it is possible to distinguish a PU in $S_1$ or in $\overline{S}_1 \cap S_2$. But they are both detection events in existing methods since they do not consider physical regions.

As indicated before, with the help of a partner CR user, the sensing performance can be improved in the common area, $S_1 \cap S_2$, but decreased in the shaded area, $\overline{S}_1 \cap S_2$. Here, a Neyman-Pearson criterion can be applied by maximizing the probability of detection, $P_d$, in $S_1$ subject to a required probability of false alarm, $P_f$, in $\overline{S}_1 \cap S_2$.

The fusion CR user may combine the spectrum sensing information received from partner CR users (block 410). According to an embodiment, at the fusion CR user, the spectrum sensing information can be combined either with soft combining or hard combining techniques, where the soft combining technique combines the actual spectrum sensing information from the partner CR users, e.g., the observed energy at a partner CR user, while the hard combining technique combines decision values (typically a one-bit value) provided by the partner CR users.

In cooperative spectrum sensing with soft combination, the fusion CR user may combine the spectrum sensing information $Y_2$ from a partner CR user with a weight $\alpha \in [0,1]$. The combined spectrum sensing information and weight may be expressed as $$Y = Y_1 + \alpha Y_2, \quad (7)$$

where Y follows a Gaussian distribution with mean µ and variance $\sigma^2$, i.e., $Y \sim N(\mu, \sigma^2)$, and $\mu = 2[(1+\alpha)M + (\gamma_1 + \alpha\gamma_2)]$ and $\sigma^2 = 4[(1+\alpha^2)M + 2(\gamma_1 + \alpha^2\gamma_2)]$. Based on Y, a final decision can be made to indicate whether there is a spectrum opportunity (block 415). If a spectrum opportunity exists, the fusion CR user may transmit (block 420) and fusion CR user operations 400 may then terminate.

The weight α reflects the contribution to the fusion CR user and depends on the distance between the partner CR user and the fusion CR user. If the partner CR user is far away and has no contribution to spectrum sensing, $\alpha=0$ and the fusion CR user will conduct local spectrum sensing. On the other hand, if the partner CR user is so close that it has the same contribution as the fusion CR user, $\alpha=1$, which is conventional cooperative spectrum sensing with equal weight.

Thus for a given distance d, the optimal weight $\alpha^{opt}$ can be obtained by maximizing detection probability of a PU subject to a required probability of false alarm. In practice, a fusion CR user could select a proper partner CR user and give it an optimal weight based on the relationship between $\alpha^{opt}$ and d.

In cooperative spectrum sensing with hard combination, partner CR users perform spectrum sensing and make a decision regarding a presence or absence of a PU, then send information regarding the decision values (preferably a one-bit indicator of the decision) to the fusion CR user. For example, a partner CR user may send a binary zero to represent that a PU was not detected and a binary one to represent that a PU was detected.

The fusion CR user may then make a final decision from the spectrum sensing information provided by the partner CR users based on a combination logic (block 415). As an example, the combination logic may be expressible as $$Z = \sum_{i=1}^{K} Y_i \begin{cases} < n, & H_1 \\ \geq n, & H_0, \end{cases} \quad (8)$$

where K=2 in a two CR user case. It has been shown that a 1-out-of-M (logical OR) combination rule, where n=1, achieves best detection performance under most practical fading channels. As an example, if one of the partner CR users reports that it has detected a PU, then the fusion CR user using the 1-out-of-M combination rule will decide that a PU is operating in the area and decide that a transmission opportunity does not exist. While, in order for the fusion CR user to decide that a transmission opportunity exists, none of the partner CR users may report the presence of an operating PU. If a spectrum opportunity exists, the fusion CR user may transmit (block 420) and fusion CR user operations 400 may then terminate.

FIG. 5 illustrates a flow diagram of partner CR user operations 500 in providing spectrum sensing information to a fusion CR user. Partner CR user operations 500 may be indicative of operations occurring in a CR user operating as a partner CR user as a fusion CR user prepares to transmit to a CR user, which may be the same as the partner CR user. Partner CR user operations 500 may occur while the partner CR user is in a normal operating mode.

Partner CR user operations 500 may begin with the partner CR user performing a spectrum sensing operation (block 505). As discussed previously, the partner CR user may utilize a variety of techniques, including using a matched filter, energy detector, and cyclostationary feature detector, as well as other passive and active detection techniques.

If hard combining techniques are used for the fusion CR user, then the partner CR user may need to make a decision about results of the spectrum sensing operation (block 510).

The decision regarding the results of the spectrum sensing operation may include the partner CR user setting a decision threshold (block 515) and then making a hypothesis decision based on the decision threshold and the results of the spectrum sensing operation (block 520).

Decision thresholds may be set for each partner CR user, with each partner CR user potentially setting its own decision threshold based on its own probability of false alarm. Decision thresholds may be used for each partner CR user in the hard combining technique since a combination rule at the fusion CR user has already been selected. In the following, the decision thresholds for both CR users (fusion CR user and partner CR user) may be optimized subject to a required probability of false alarm under a certain distance d. In brief, there may be two steps to design the decision thresholds:

1) Obtain the sensing performance at each individual partner CR user, and
2) Obtain the overall detection performance under the OR rule and get optimal $P_f$ of each fusion CR user, which leads to the decision thresholds.

As shown in FIG. 2, the location of a first PU (PU position A) with respect to the fusion CR user (CR user 201) in $S_1$ may be expressed as $(r, \theta)$, where r is the distance between the first PU and the fusion user and $\theta$ is the angle between a line from the fusion CR user to the first PU and a line segment connecting the two CR users (the fusion CR user and the partner CR user (CR user 202)). An additional assumption includes $(r', \theta')$ as the position of a second PU (PU position B) within $\overline{S}_1 \cap S_2$ relative to the fusion CR user.

1) Sensing performance at each partner CR users: For a given d in $H_1$ case, where the second PU is located in the position $(r', \theta') \in \overline{S}_1 \cap S_2$, the probability of false alarm for partner CR user i is $$P_{fi} = Pr(\text{decision is } H_0 \mid H_1 \text{ is true}) = Q\left(\frac{\lambda_i - \mu(r', \theta')}{\sqrt{2}\,\sigma(r', \theta')}\right), \quad (9)$$

where $$i = 1, 2, \quad Q(x) = \frac{1}{\sqrt{2\pi}} \int_x^{+\infty} e^{-\frac{\tau^2}{2}} d\tau,$$

and $\mu(r', \theta')$ and $\sigma(r', \theta')$ are functions of $(r', \theta')$. Then the threshold can be obtained from (9) as $$\lambda_i = \sqrt{2}\sigma(r',\theta')Q^{-1}(P_{fi}) + \mu(r',\theta'), \quad (10)$$

which is determined by $P_{fi}$.

In $H_0$ case, where the first PU is located in $(r, \theta) \in S_1$, the probability of detection of partner CR user i can be expressed as $$P_{di} = Pr(\text{decision is } H_0 \mid H_0 \text{ is true}) = Q\left(\frac{\lambda_i - \mu(r, \theta)}{\sqrt{2}\,\sigma(r, \theta)}\right) \quad (11)$$

where $\mu(r, \theta)$ and $\sigma(r, \theta)$ are the functions of $(r, \theta)$. Substitute (10) into (11) then $$P_{di} = Q\left(\frac{\sqrt{2}\,\sigma(r',\theta')Q^{-1}(P_{fi}) + \mu(r',\theta') - \mu(r,\theta)}{\sqrt{2}\,\sigma(r,\theta)}\right). \quad (12)$$

From (12), $P_{fi}$ determines $P_{di}$. Directly, the optimal $P_{fi}$ will be designed for simplicity. So the corresponding optimal $\lambda_i$ can be obtained from (10) in a straightforward manner.

2) Decision thresholds at the fusion CR user: Under the OR rule, the fusion CR user combines decision information and the overall $P_f$ can be expressed as $$P_f = 1 - (1 - P_{f1})(1 - P_{f2}). \quad (13)$$

Similarly, the overall detection probability of PU can be expressed as $$P_d = 1 - (1 - P_{d1})(1 - P_{d2}), \quad (14)$$

where $P_{di}$ can be obtained in (12). According to (12) and (14), $P_d$ is a function of $P_{fi}$, $(r',\theta')$, and $(r, \theta)$.

Since the location of the second PU is unknown to both CR users, it is necessary to average $(r', \theta')$ and $\theta$ to obtain the averaged $P_d$ as $$\overline{P}_d(r, P_{f_1}, P_{f_2} \mid d) = \frac{1}{2\pi} \int_{\theta=0}^{2\pi} \iint_{(r',\theta') \in \overline{S}_1 \cap S_2} P(r', \theta') P_d\, dr'\, d\theta'\, d\theta, \quad (15)$$

where $P(r', \theta')$ represents the distribution of $(r', \theta')$ and r determines the SNR at the fusion user. Therefore, under the Neyman-Pearson criterion, the optimal $P_{f1}$ and $P_{f2}$ can be obtained by $$\{P_{f1}^{opt}, P_{f2}^{opt}\}|_d = arg_{P_{f1}, P_{f2}} \max\{\overline{P}_d(r; P_{f1}, P_{f2} \mid d)\}, \quad (16)$$

where $P_{f1}$ and $P_{f2}$ satisfy (13) for a required $P_f$. Then the optimal thresholds, $\lambda_1^{opt}$ and $\lambda_2^{opt}$ can be obtained by (10).

Similarly, it is very difficult to obtain the analytical expression for $P_{f1}^{opt}$ and $P_{f2}^{opt}$. In practice, the optimal thresholds or $P_{fi}$ can be calculated off-line for a target application environment with a specific channel model.

The results of the spectrum sensing operation may then be compared with the decision threshold to make a hard decision about the presence or absence of a PU (block 520). For example, if the results of the spectrum sensing operation are greater than the decision threshold, then the partner CR user may determine that there is a PU operating in the vicinity, while if the results are less than the decision threshold, then the partner CR user may determine that there isn't a PU operating in the vicinity, or vice versa.

If soft combining techniques are used at a fusion CR user, then the partner CR user does not need to make a decision about the results of the spectrum sensing operation since the fusion CR user makes the decision based on the results of the spectrum sensing operation.

The partner CR user may then coordinate with the fusion CR user (and potentially other CR users operating in the vicinity) to share the results of the spectrum sensing operation (block 525). The information shared between the CR users may include information that is based on a relative position of the CR users. For example, if hard combining techniques are used, then the decision information is based on the probability of false alarm, which may be a function of the relative position of the CR users. While, if soft combining techniques are used, then positional information about the CR users may be shared. The positional information may later be used to weight the results of the spectrum sensing operations. If the fusion CR user uses hard combining techniques, the partner CR user may share a one-bit indicator of the decision with the fusion CR user. If the fusion CR user uses soft combining techniques, the partner CR user may share the results of the spectrum sensing operation, such as a SNR measurement, with the fusion CR user. If the partner CR user is also a CR receiver, then the partner CR user may then receive a transmission from the fusion CR user (block 530). Partner CR user operations 500 may then terminate.

Analysis of the characteristics of communication-oriented cooperative spectrum sensing was performed. The soft combination case is omitted since it is similar to the hard combination case.

In the analysis, assumptions include that the sensing range is a circle with a radius of R=1 km, the required false alarm probability, $P_f=0.05$, and M=6 samples are used for a decision. The SNR in the following denotes SNR at a fusion CR user, and the PUs are randomly located in physical regions in each Monte Carlo trail and use a Raleigh fading channel. A previously disclosed path loss model is used, PL(dB)=128.1+37.6 lg(r), for r≧0.035 km.

Figure 6:
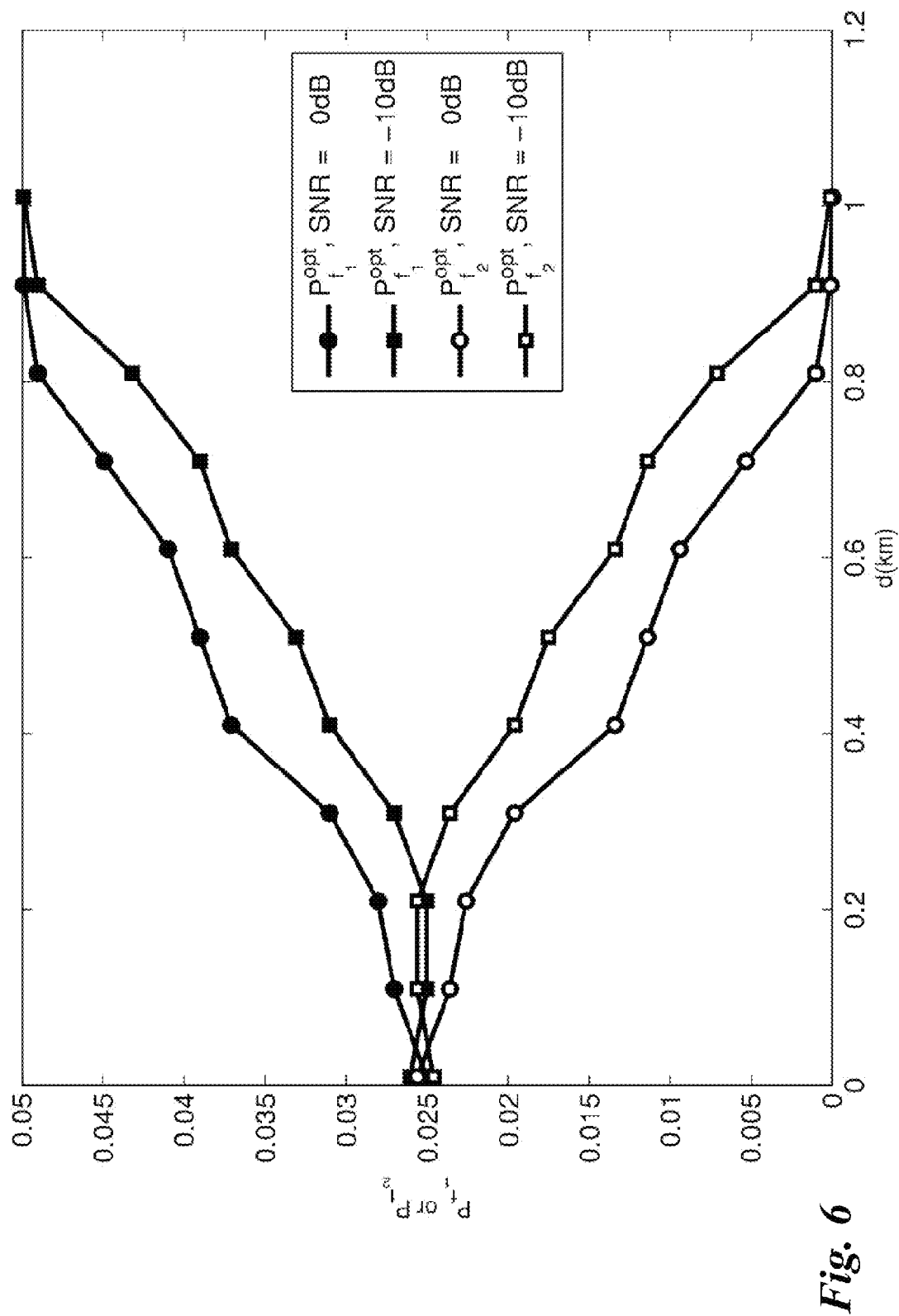
FIG. 6 is a plot of optimal $P_{f1}$ and $P_{f2}$ versus the distance between two CR users.

FIG. 6 illustrates the optimal $P_{f1}$ and $P_{f2}$ versus the distance between two CR users, d, and the optimal thresholds can be obtained straightforwardly. From FIG. 6, $P_{f1}$ increases as d increases, while $P_{f2}$ decreases and $P_{f2} \approx 0$ when d>0.9 R, which means the partner CR user is unable to help the fusion CR user if it is far away.

Figure 7:
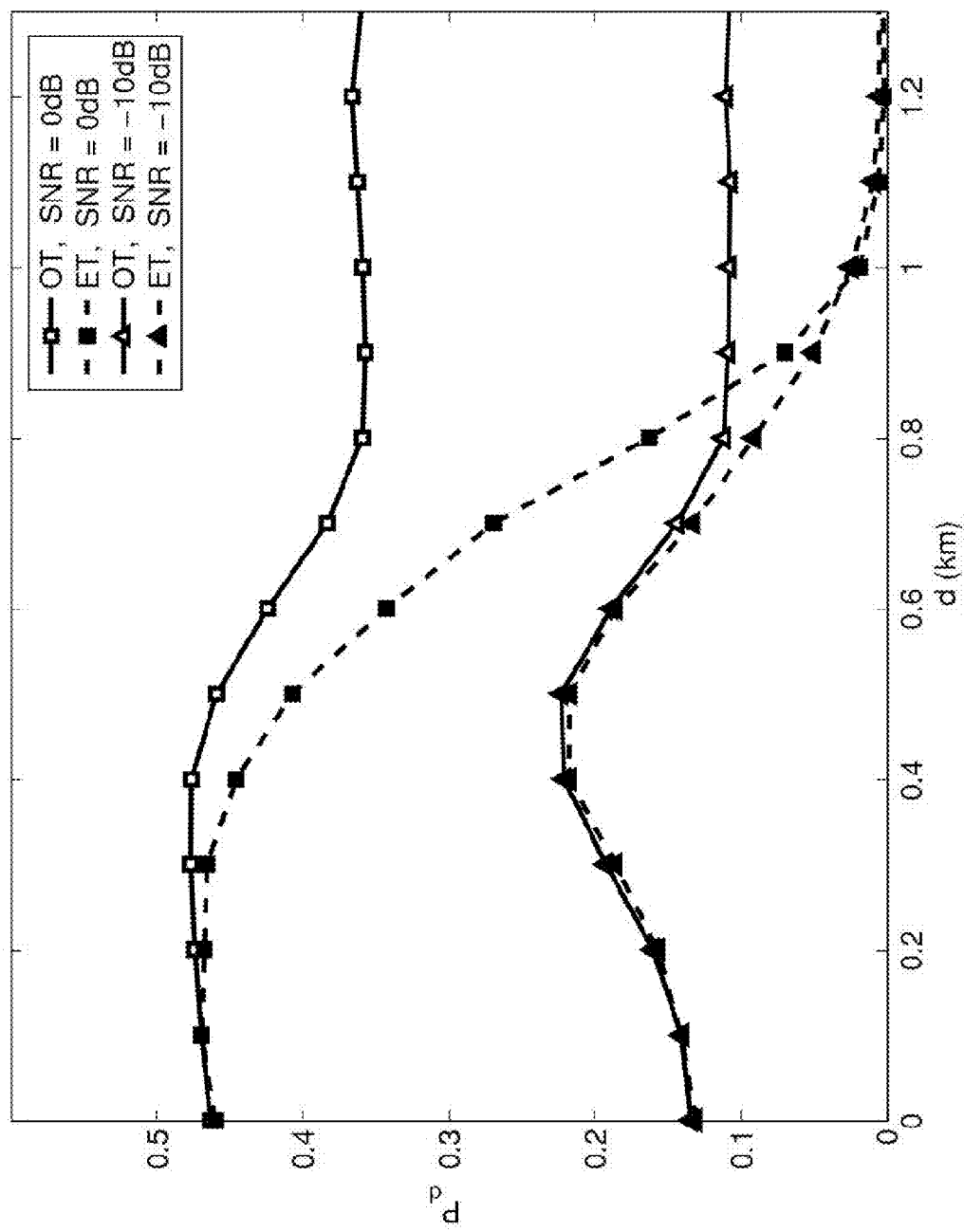
FIG. 7 is a plot of detection performance of communication-oriented cooperative spectrum sensing with optimal thresholds.

FIG. 7 illustrates the detection performance of communication-oriented cooperative spectrum sensing with optimal thresholds (OT), where $\alpha = \alpha_{opt}$, and an existing cooperative spectrum sensing method with equal thresholds (ET). From FIG. 7, when SNR=0 dB, $P_d$ with ET decreases dramatically as d increases while $P_d$ with OT decreases gradually and is approximately constant when d>0.9 R. Since $P_{f2} \approx 0$ in d>0.9 R region, the ET curve of this region represents the $P_d$ of single CR user sensing, which means that the performance of existing cooperative spectrum sensing is even worse than that of local sensing when d is large. Also, when SNR=−10 dB, the performance gap of OT and ET is similar with that of SNR=0 dB case. Therefore, OT is critical for cooperative spectrum sensing and an improper partner CR user may disable the fusion CR user's communication.

Also from FIG. 7, the best detection performance appears when d 0.45 R, in other words, such a partner CR user is most effective to improve $P_d$. The improved detection performance at d≈0.45 R is because when a fusion CR user is with low SNR due to the path loss, the partner CR user may also experience low SNR if they are either too close or too far away, but with proper distance between fusion d≈0.45 R user and partner d≈0.45 R user, there is a probability that the partner d≈0.45 R user is close to the target PU with high SNR and help to boost $P_d$.

For a given probability of false alarm $P_f$, the spectrum opportunity of existing cooperative spectrum sensing can be obtained by $$SO_1 = Pr\{k=0, S_1\}(1-P_f) = e^{-\lambda S}(1-P_f), \quad (17)$$

which is from the prospective of detection and does not distinguish the detection region shown in FIG. 2. While from the perspective of communication, there is still a spectrum opportunity if a PU is located in the shaded region in FIG. 2 and the final decision is idle. Such spectrum opportunity can be expressed as $$SO_2 = Pr\{k=0, S_1\}(1 - Pr\{k=0; \overline{S}_1 \cap S_2\}). \quad (18)$$

Therefore, the overall spectrum opportunity consists of two components as follows, $SO = SO_1 + SO_2$.

Figure 8:
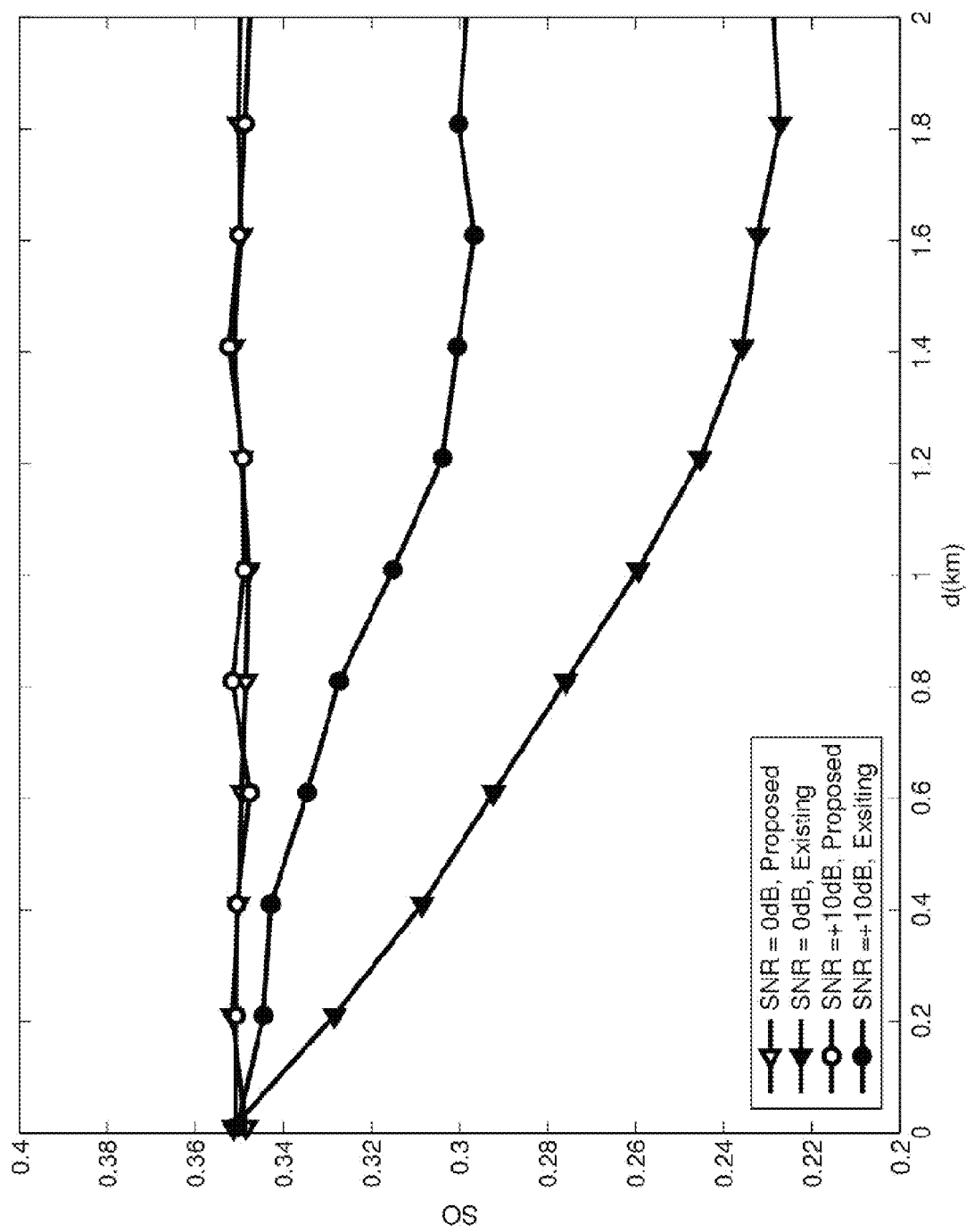
FIG. 8 is a plot of overall spectrum opportunities of existing cooperative spectrum sensing and communication-oriented cooperative spectrum sensing.

FIG. 8 illustrates the overall spectrum opportunities, SO, of existing cooperative spectrum sensing and communication-oriented cooperative spectrum sensing, where the expected number of PU's per unit area $S_1$ is $\lambda=1$ and $P_f=0.05$. From FIG. 8, the spectrum opportunity of the existing cooperative spectrum sensing method exponentially decreases as the distance d increases since it is without the distinguishing ability of a PU in different areas as in FIG. 2, while the communication-oriented cooperative spectrum sensing method could considerably improve the spectrum opportunity.

Communication-oriented cooperative spectrum sensing may be implemented in practice in the following two steps:

1) According to SNR at a fusion user, select a partner user with proper d, and

2) According to d of the selected partner user, choose an optimal weight for combining or optimal threshold for local decision.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for cognitive radio (CR) user operation, the method comprising:
   coordinating with partner CR users to share spectrum sensing information;
   combining spectrum sensing information from the partner CR users;
   determining if a transmission opportunity exists based on the combined spectrum sensing information;
   transmitting a message to a CR user if the transmission opportunity exists; and
   storing the message if the transmission opportunity does not exist.

2. The method of claim 1, wherein combining spectrum sensing information comprises:
   applying a weighting factor to the spectrum sensing information received from each partner CR user, wherein the weighting factor applied to the spectrum sensing information received from a partner CR user is specific for the partner CR user, thereby producing a weighted spectrum sensing information for the partner CR user; and
   summing weighted spectrum sensing information for each of the partner CR users to produce combined spectrum sensing information.

3. The method of claim 2, wherein determining if a transmission opportunity exists comprises comparing the combined spectrum sensing information with a threshold.

4. The method of claim 2, wherein summing weighted spectrum sensing information further comprises summing spectrum sensing information from a computing CR user, wherein the computing CR user is a CR user performing the summing.

5. The method of claim 1, wherein combining spectrum sensing information comprises applying a combination rule to the spectrum sensing information received from each partner CR user, wherein the combination rule produces a logical true or a logical false based on the spectrum sensing information received from each partner CR user.

6. The method of claim 5, wherein determining if a transmission opportunity exists comprises:
   setting the transmission opportunity exists to true if a result of applying the combination rule is a logical true; and setting the transmission opportunity exists to false if the result of applying the combination rule is a logical false.

7. The method of claim 5, wherein applying the combination rule further comprises applying the combination rule to spectrum sensing information produced by a computing CR user, wherein the computing CR user is a CR user performing the applying.

8. A method for cognitive radio (CR) user operation, the method comprising:
sensing a spectrum, wherein the spectrum comprises a frequency band used for transmissions by a CR user that overlaps with at least a portion of a protected frequency band; and
coordinating with partner CR users to share spectrum sensing information, wherein the coordinating includes sharing information based on a relative position of the CR user and the partner CR users.

9. The method of claim 8, further comprising receiving a message from a fusion CR user, wherein the message is transmitted based on shared spectrum sensing information that is adjusted based on relative positions of the fusion CR user and the partner CR users.

10. The method of claim 8, further comprising making a decision based on a result of the spectrum sensing.

11. The method of claim 10, wherein making a decision comprises:
setting a decision threshold; and
computing a hypothesis based on the decision threshold and the result of the spectrum sensing.

12. The method of claim 11, wherein setting a decision threshold comprises:
obtaining spectrum sensing performance of each partner CR user; and
computing a false alarm probability based on the obtained spectrum sensing performance.

13. The method of claim 12, wherein computing a false alarm probability comprises:
computing a probability, Pr(decision is $H_0|H_1$ is true); and
computing a probability, Pr(decision is $H_0|H_0$ is true),
where $H_0$ represents a hypothesis that a primary user is active in a region containing a computing CR user, $H_1$ represents a hypothesis that a primary user is not active in a region containing the computing CR user, where the computing CR user is a CR user computing the probabilities, and Pr( ) is a probability function.

14. The method of claim 13, wherein computing a probability, Pr(decision is $H_0|H_1$ is true) comprises evaluating $$Q\left(\frac{\lambda_i - \mu(r', \theta')}{\sqrt{2}\,\sigma(r', \theta')}\right), \text{where}$$

$$i = 1, 2, Q(x) = \frac{1}{\sqrt{2\pi}} \int_x^{+\infty} e^{-\frac{\tau^2}{2}} d\tau,$$

$\mu(r', \theta')$ is a mean of $(r', \theta')$, $\sigma(r', \theta')$ is a standard deviation of $(r', \theta')$, and $(r', \theta')$ are polar coordinates of a primary user relative to the computing CR user.

15. The method of claim 13, wherein computing a probability, Pr(decision is $H_0|H_1$ is true) comprises evaluating $$Q\left(\frac{\lambda_i - \mu(r, \theta)}{\sqrt{2}\,\sigma(r, \theta)}\right), \text{where}$$

$$i = 1, 2, Q(x) = \frac{1}{\sqrt{2\pi}} \int_x^{+\infty} e^{-\frac{\tau^2}{2}} d\tau,$$

$\mu(r, \theta)$ is a mean of $(r, \theta)$, $\sigma(r, \theta)$ is a standard deviation of $(r, \theta)$, and $(r, \theta)$ are polar coordinates of a primary user relative to the computing CR user.

16. The method of claim 11, wherein computing a hypothesis comprises:
setting a hypothesis $H_0$ to true if the result of the spectrum sensing is greater than the decision threshold; and
setting a hypothesis $H_1$ to true if the result of the spectrum sensing is less than the decision threshold,
where $H_0$ represents a hypothesis that a primary user is active in a region containing a computing CR user and $H_1$ represents a hypothesis that a primary user is not active in a region containing the computing CR user, where the computing CR user is a CR user computing the hypothesis.

17. The method of claim 16, wherein coordinating with partner CR users comprises sharing either hypothesis $H_0$ or hypothesis $H_1$ with the partner CR users.

18. The method of claim 8, wherein a soft combining of spectrum sensing results is being used, and wherein coordinating with partner CR users comprises sharing a measurement of the spectrum with the partner CR users.

19. A communications device comprising:
a receiver coupled to an antenna, the receiver configured to receive signals detected by the antenna;
a transmitter coupled to the antenna, the transmitter configured to transmit signals using the antenna; and
a processor coupled to the receiver and to the transmitter, the processor configured to sense a state of a spectrum band over which signals are transmitted and received, to combine spectrum band state information received from neighboring communications devices, and to compute a decision threshold for deciding if the spectrum band is occupied or idle.

20. The communications device of claim 19, wherein the processor comprises:
a spectrum sensing unit configured to sense a state of the spectrum band;
a combining unit coupled to the spectrum sensing unit, the combining unit configured to combine the state of the spectrum band and spectrum band state information received from the neighboring communications devices; and
a threshold unit coupled to the spectrum sensing unit, the threshold unit configured to compute the decision threshold based on a probability of a false alarm.

21. The communications device of claim 19, wherein the processor is further configured to compute weighting factors for the spectrum band state information received from the neighboring communications devices, wherein the weighting factors are computed separately for each neighboring communications device.

22. The communications device of claim 21, wherein the processor comprises a weighting unit configured to compute the weighting factors for the spectrum band state information received from the neighboring communications devices, wherein the weighting factors are computed based on a distance between the communications device and each of the neighboring communications devices.

* * * * *